2,923,634
Patented Feb. 2, 1960

2,923,634
METHOD OF CONTROLLING UNDESIRABLE PLANT GROWTH

Robert F. Lindemann, Painesville, Ohio, assignor to Diamond Alkali Company, Cleveland, Ohio, a corporation of Delaware No Drawing. Application April 4, 1958
Serial No. 726,357

11 Claims. (Cl. 71—2.6)

This invention relates to improvements in biologically active materials and more particularly to improved compositions and to methods for controlling plant growth. More specifically, this invention relates to plant growth regulants, i.e., herbicidal compositions, containing as an active ingredient dimethyl 2,3,5,6-tetrahaloterephthalates of the structure:

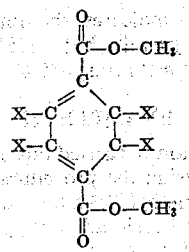

wherein X is halogen, i.e., fluorine, chlorine, bromine or iodine, chlorine being preferred.

Up to this time many substances, both organic and inorganic, have been proposed and used as herbicides. However, the problem of controlling undesirable plant growth still persists. Selectively controlling undesirable plant growth is becoming increasingly important as more and more land is utilized in farming, gardening, lawn purposes and other applications wherein the control of undesired vegetation including the many varieties of grass type weeds is essential. Accordingly, while a large number of herbicides have heretofore been proposed and have enjoyed varying degrees of commercial success, the problem of selectively controlling plant growth remains a troublesome one.

Illustrative of prior herbicidal materials are such organic substances as 2,4-D and 2,4,5-T, carbamates such as isopropyl N-(3-chlorophenyl)carbamate, pentachlorophenol, 2,2-dichloropropionic acid, and the like. Inorganic materials such as borax salt, arsenite, cyanide, cyanate, chlorate, sulfamate and so forth also have been proposed and used. In many instances, these materials are satisfactory in specific applications; in other applications, however, they have not been entirely suitable. Many of the more effective organic herbicides heretofore proposed have either been too costly for effective wide spread use; have been nonselective, thus killing both desirable and undesirable plant growth; or have involved handling of toxic substances or materials which are dangerous or undesirable in application. On the other hand, many of the inorganic substances such as borax or salt, while more economical in many instances, are relatively inefficient. In addition, such compounds at times are nonselective and so toxic as to sterilize soil for extended periods when such action is not desired.

Accordingly, it is an object of this invention to provide new and improved selective plant growth regulating compositions which not only are economical to produce and use, but which are singularly effective.

A further object of this invention is the provision of new and improved herbicidal compositions and methods for controlling plant growth.

A still further object of this invention is to provide new and improved plant growth regulating compositions characterized by selective pre-emergent herbicidal activity.

These and other objects and advantages of the invention will appear more fully from the following description hereinafter set forth.

The present invention comprises a selective herbicidal composition containing a carrier and an active toxic amount of a dimethyl 2,3,5,6-tetrahaloterephthalate, preferably dimethyl 2,3,5,6-tetrachloroterephthalate, and the method of controlling plant growth by the use of such a composition. Such compositions may be used alone or in combination with other biologically active materials such as organic phosphate pesticides, chlorinated hydrocarbon pesticides, other pre- and post-emergent broad and selective herbicides, foliage and soil fungicides, nematocides, bactericides and the like.

Dimethyl 2,3,5,6-tetrahaloterephthalate may be prepared by halogenating terephthalyl dichloride, e.g., by chlorinating terephthalyl dichloride as described by N. Rabjohn in the "Journal of the American Chemical Society," vol. 70, page 3518 (1948), and reacting the resultant tetrahaloterephthalyl dichloride with methanol, preferably at reflux. The product may be purified by recrystallization from an organic solvent if desired.

It will be understood, of course, that dimethyl 2,3,5,6-tetrahaloterephthalate, especially dimethyl 2,3,5,6-tetrachloroterephthalate, may be utilized in diverse formulations, including finely-divided powders and granular materials as well as liquids, such as solutions, concentrates, emulsifiable concentrates, slurries and the like, depending upon the application intended and the formulation media desired.

Thus, it will be appreciated that dimethyl 2,3,5,6-tetrahaloterephthalate of this invention may be employed to form biologically active substances containing such compounds as essential active ingredients, which compositions may also include finely-divided dry or liquid diluents, extenders, fillers, conditioners, including various clays, diatomaceous earth, talc, spent catalyst, alumina-silica materials, liquids, solvents, diluents, etc. including water and various organic liquids, such as kerosene, benzene, toluene, chlorinated benzene, acetone, cyclohexanone, carbon disulfide, alcohols, and various mixtures thereof.

When liquid formulations are employed or dry materials prepared which are to be used in liquid form, it is desirable in certain instances additionally to employ a wetting, emulsifying, dispersing, or other surface active agent to facilitate use of the formulation, e.g., Triton X-155 (alkyl aryl polyether alcohol, U.S. Patent 2,504,-064), cationic quaternary ammonium salts, and alkyl aryl sulfonates.

The term "carrier" as employed is intended to refer broadly to materials constituting a major proportion of a biologically active or other formulation and hence includes finely-divided materials, both liquids and solids, as aforementioned generally used in such application.

In order that those skilled in the art may more completely understand the present invention and the preferred methods by which the same may be carried into effect, the following specific examples are offered.

EXAMPLE I

Preparation of dimethyl 2,3,5,6-tetrachloroterephthalate 2,500 ml. of methanol and 100 g. of 2,3,5,6-tetrachloroterephthalyl dichloride are refluxed in a reaction flask for 12 hours. The mixture is then evaporated to half its volume and cooled to precipitate the desired product. Upon recrystallization from 1000 ml. of methanol, 90 g. of desired dimethyl 2,3,5,6-tetrachloroterephthalate melting at 155°–156° C. is obtained. This product is less than 5% soluble in water and greater than 5% soluble in acetone, cyclohexanone and xylene, and has the following chlorine content, thus evidencing preparation of the desired compound:

| Element | Actual percent by Wgt. | Calculated percent by Wgt. |
|---|---|---|
| Cl | 41.7 | 42.9 |

EXAMPLE II

An herbicidal evaluation is carried out to detect root absorption and translocation wherein tomato plants, variety Bonny Best, 5″ to 7″ tall, and bean plants, variety Tendergreen, are treated by pouring 51 ml. of a 2000 p.p.m. aqueous test formulation (2000 p.p.m. dimethyl 2,3,5,6-tetrachloroterephthalate, 5% acetone, 0.01% Triton X–155, balance water) onto the soil in 4″ pots, i.e., 102 mg./pot or approximately equivalent to 128 lbs./acre in which the plants are growing. Plants are held under controlled greenhouse conditions for 10 days before examination, after which time phytotoxicity is rated on a scale from 0 for no injury to 11 for plant kill. Using this procedure, ratings of 0 for both the tomato plants and bean plants are observed, indicating no injury to established bean and tomato plants.

EXAMPLE III

To demonstrate the effect of dimethyl 2,3,5,6-tetrachloroterephthalate upon the germination of seeds in soil, a mixture of seeds of six crop plants is broadcast in 8″ x 8″ x 2″ metal cake pans filled to within one-half inch of the top with composted soil.

The seed mixture contains representatives of three broadleafs: turnip, flax and alfalfa, and three grasses: wheat, millet and rye grass. The seed is uniformly covered with about one-quarter inch of soil and then watered. After 24 hours, 80 ml. of an aqueous test formulation (16 lbs./acre dimethyl 2,3,5,6-tetrachloroterephthalate, 5% acetone, 0.01% Triton X–155, balance water) is poured uniformly over the surface of the pan. Two weeks after treatment, records are taken on seedling stand as compared to untreated controls. Using this procedure, results indicate 100% stand for the broadleafs and 10% stand for the grasses, thus evidencing a high degree of selective pre-emergent herbicidal activity.

EXAMPLE IV

A further test evaluating herbicidal activity is carried out using seeds of perennial rye grass and radish which are treated in Petri dishes with aqueous suspensions of dimethyl 2,3,5,6-tetrachloroterephthalate at concentrations of 100 and 1000 p.p.m., i.e., 100 and 1000 p.p.m. product of Example I—5% acetone, 0.01% Triton X–155, balance water. Lots of 25 seeds of each type are scattered in separate dishes containing filter paper discs moistened with 5 ml. of the test formulation at each concentration. After 7 to 10 days under controlled conditions, the product of Example I is given a rating which corresponds to the minimum concentration that inhibits germination of half of the seeds in the test. Using this test, the product of Example I receives ratings of greater than 1000 p.p.m. for the radish and less than 10 p.p.m. or the rye grass, again indicating a high degree of selective pre-emergent herbicidal activity.

EXAMPLE V

In order to demonstrate the effectiveness of the product of Example I against crab grass (*Digitaria sanguinalis*) a pre-emergent herbicide evaluation is carried out by comparing the product of Example I with isopropyl N-(3-chlorophenyl) carbamate, and 2,2-dichloropropionic acid. In this test each of the above compounds is applied at a concentration of 2 and 0.5 lbs./acre in a formulation containing 10% acetone and the remainder water. Several checks are run in this evaluation and results are recorded 4 weeks after planting comparing the fresh weight of the test plants to the check plants. Employing such a procedure, the results indicate that the compound of the present invention effects better pre-emergent activity than the standards employed. This comparative data is shown in the following Table I:

TABLE I

| Test Material | Dosage, lb./acre | Fresh wgt. expressed as percent of checks, 4 weeks after planting |
|---|---|---|
| Dimethyl 2,3,5,6-tetrachloroterephthalate | 2<br>0.5 | Trace<br>8 |
| Isopropyl N-(3-chlorophenyl) carbamate | 2<br>0.5 | 38<br>67 |
| 2,2-dichloropropionic acid | 2<br>0.5 | Trace<br>34 |

As the above data indicates, the dimethyl 2,3,5,6-tetrachloroterephthalate permits but an 8% growth as compared to percent growth ratings of 67 and 34 for the two standards.

EXAMPLE VI

A further evaluation is carried out employing the product of Example I using the procedure given in Example V in which the dimethyl 2,3,5,6-tetrachloroterephthalate indicates an extended residual activity of better than 6½ weeks at a dosage of 2 lbs./acre.

It is to be understood that although the invention has been described with specific reference to particular embodiments thereof, it is not to be so limited since changes and alterations therein may be made which are within the full intended scope of this invention as defined by the appended claims.

What is claimed is:

1. The method of controlling undesirable plant growth which comprises contacting said plant growth with an active amount of dimethyl 2,3,5,6-tetrahaloterephthalate.

2. The method of controlling undesirable plant growth which comprises contacting said plant growth with an active amount of dimethyl 2,3,5,6-tetrachloroterephthalate.

3. The method of pre-emergently controlling plant growth by contacting the seed of said plants with a herbicidal amount of dimethyl 2,3,5,6-tetrahaloterephthalate.

4. The method of pre-emergently controlling plant growth which comprises contacting the seed of said plants with a herbicidal amount of dimethyl 2,3,5,6-tetrachloroterephthalate.

5. The method of pre-emergently controlling plant growth by contacting the soil around the seeds of said plants with a herbicidal amount of dimethyl 2,3,5,6-tetrahaloterephthalate.

6. The method of pre-emergently controlling plant growth by contacting the soil around the seeds of said plants with a herbicidal amount of dimethyl 2,3,5,6-tetrachloroterephthalate.

7. The method of controlling undesirable grass growth which comprises contacting said grass with an active amount of dimethyl 2,3,5,6-tetrahaloterephthalate.

8. The method of controlling undesirable grass growth which comprises contacting said grass with an active amount of dimethyl 2,3,5,6-tetrachloroterephthalate.

9. The method of controlling the growth of crab grass which comprises contacting said grass with an active amount of dimethyl 2,3,5,6-tetrahaloterephthalate.

10. The method of controlling crab grass in an area of established grass which comprises contacting the soil in which the grass is growing with a herbicidal amount of dimethyl 2,3,5,6-tetrahaloterephthalate prior to emergence of the crab grass.

11. The method of controlling crab grass in an area of established grass which comprises contacting the soil in which the grass is growing, prior to emergence of the crab grass, with a herbicidal amount of dimethyl 2,3,5,6-tetrachloroterephthalate.

References Cited in the file of this patent

Rabjohn in "Chemical Abstracts," 1949, vol. 43, col. 609(f).

King: U.S. Dept. Agri. Handbook, No. 69, May 1954, page 321.

UNITED STATES PATENT OFFICE
CERTIFICATE OF CORRECTION

Patent No. 2,923,634                  February 2, 1960

Robert F. Lindemann

It is hereby certified that error appears in the printed specification of the above numbered patent requiring correction and that the said Letters Patent should read as corrected below.

Column 1, lines 22 to 33, the formula should appear as shown below instead of as in the patent:

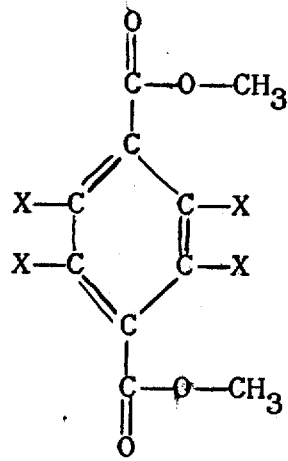

column 3, line 69, for "or the" read -- for the --.

Signed and sealed this 2nd day of August 1960.

(SEAL)
Attest:

KARL H. AXLINE
Attesting Officer

ROBERT C. WATSON
Commissioner of Patents